Inventors:
Harry Simon,
Joseph P. Gleason,
by Merton D. Moore
Their Attorney.

Patented Apr. 15, 1952

2,592,611

UNITED STATES PATENT OFFICE 2,592,611

DELAYED PULSE GENERATOR

Harry Simon, Baldwinsville, and Joseph P. Gleason, Syracuse, N. Y., assignors to General Electric Company, a corporation of New York Application September 29, 1950, Serial No. 187,584

5 Claims. (Cl. 250—27)

This invention relates to the production of electrical pulses that are time delayed an adjustable amount with respect to the time occurrence of reference pulses.

An object of the invention is to provide an improved means for producing an electrical pulse that is delayed with respect to a reference pulse.

Another object of the invention is to provide an improved means for producing a plurality of electrical pulses having different delay times with respect to a reference pulse.

A further object of the invention is to provide an improved means for starting and stopping oscillations in a resonant circuit.

A still further object of the invention is to provide means for starting and stopping oscillations in a plurality of differently tuned circuits under control of a common switching arrangement.

According to one preferred embodiment of the invention, a resonant circuit of series connected inductance and capacitance elements is shock excited by rendering a gaseous discharge device operative in response to a reference pulse. The resultant oscillation is utilized to produce an output pulse delayed with respect to the time of occurrence of the reference impulse. The oscillation is also employed for rendering the gaseous device inoperative.

Figure 1:
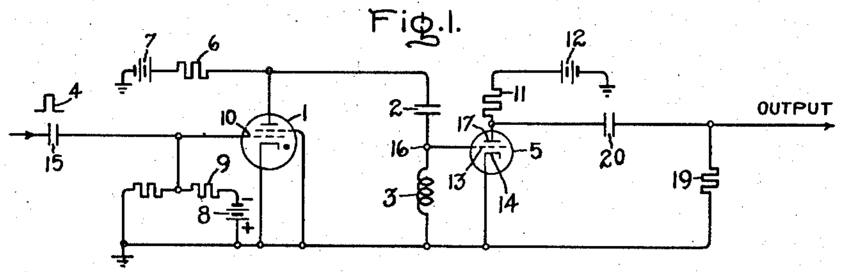
Figure 3:
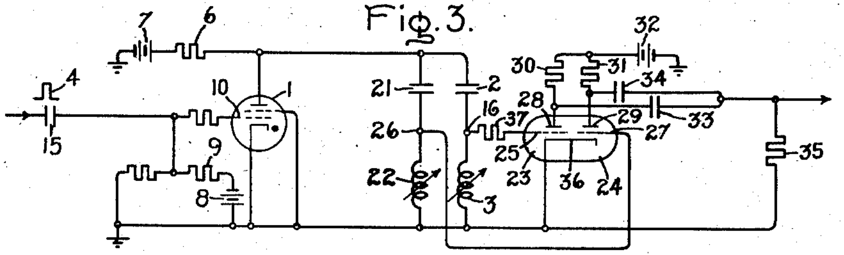
Figure 2:
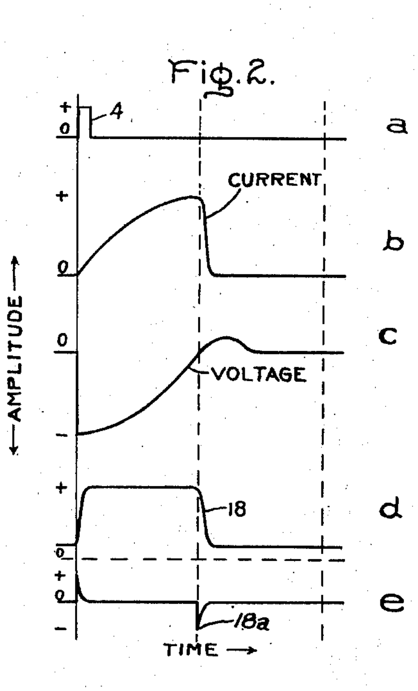
Figure 4:
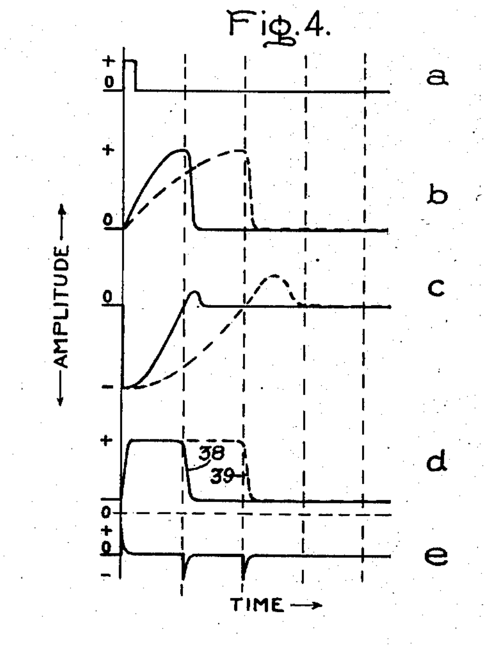

The novel features which I believe characteristic of my invention are set forth with particularity in the appended claims. My invention itself, however, both to its organization and method of operation, together with further objects and advantages thereof, may best be understood by reference to the following description taken in connection with the accompanying drawings in which Fig. 1 shows an embodiment of my invention; Fig. 2 illustrates certain characteristics of its operation; Fig. 3 shows a modification, and Fig. 4 illustrates certain characteristics of the operation of the form of the invention illustrated in Fig. 3.

Referring to Fig. 1 there is disclosed a circuit arrangement for forming an output pulse having an accurately controllable time delay with respect to an initiating or reference pulse. Briefly, the circuit comprises a gaseous discharge device 1 having a serious resonant circuit 2, 3 connected between its anode and cathode. The inductance 3 of this circuit is connected between the grid and cathode of a second discharge device 5 to supply oscillations thereto. This device 5 is a highly evacuated electron discharge device which is supplied with anode operating voltage from source 12 through resistance 11. Condenser 20 and resistance 19 are connected between its anode and cathode and the point between them is connected to the output or load circuit, not shown. The elements 20 and 19 serve as a differentiating circuit as will presently be described.

Under normal conditions with no incoming trigger pulse 4 being available, gaseous discharge device 1, having its gaseous discharge path connected between ground and the battery 7, is normally held non-conductive by the application of a negative bias applied from battery 8 through resistor 9 to its grid electrode 10. Under these conditions, the condenser 2 is charged to approximately the full potential of battery 7.

Device 5, having its electron discharge path connected through the anode loading resistor 11 to a source of positive potential 12, is normally conductive because its grid electrode 13 is tied through the relatively low direct current resistance of inductance 3 to the cathode electrode 14.

Upon the arrival of a positive trigger pulse 4 over condenser 15 to the control grid 10, the gaseous discharge device 1 is rendered operative to conduct heavily, thereby shock exciting the series resonant circuit 2, 3 into oscillation by causing the charge previously developed across condenser 2 to discharge into the inductance 3 through the gaseous discharge path of device 1. The resultant current flow through inductance 3 is of a sinusoidal nature for substantially a quarter cycle at the series resonance frequency of elements 2 and 3. The corresponding sinusoidal voltage developed across inductance 3, that is, between terminal 16 and ground, leads the current in the inductance by 90° and has a sharp substantially instantaneously negative going pulse followed by a sinusoidal return toward zero voltage. The sudden negative going pulse of voltage occurring substantially at the commencement of conduction of device 1 immediately cuts off electrons discharge device 5, thereby generating a positive-going voltage pulse at its anode electrode 17. Discharge device 5 remains non-conductive during substantially the entire negative polarity portion of the voltage available at terminal 16. This voltage exists for substantially a quarter cycle of the oscillation frequency determined by the values of condenser 2 and inductance 3.

As soon as the voltage at terminal 16 and hence grid 13 becomes sufficiently positive to overcome the normal cutoff bias of device 5, device 5 conducts again. This sudden conduction of device 5 occurring after a quarter cycle of oscillation of the series resonant circuit provides a negative going trailing edge to the voltage wave developed at anode 17 which is delayed with respect to the arrival of the incoming trigger 4.

Differentiation of the voltage wave developed at anode 17 by condenser 20 and resistor 19 yields a negative going trigger pulse at the output lead. This negative trigger pulse occurs substantially a quarter cycle at the oscillation frequency of elements 2 and 3 after the arrival of the incoming trigger 4 at the grid 10 of device 1.

In order to generate additional delayed pulses it is necessary to render the gaseous discharge device 1 non-conductive, thereby permitting condenser 2 to charge up once again to substantially the potential of battery 7 through resistance 6 before the arrival of a subsequent trigger pulse 4. In accordance with the invention, the oscillation developed in the resonant circuit in addition to controlling operation of device 5, is also employed to cut off the gaseous discharge device 1 after a given time interval. Thus when the sinusoidal voltage developed across inductance 3 has progressed substantially a quarter cycle at the resonant frequency of elements 2 and 3, device 5 is rendered conductive. During conduction, the input circuit of device 5 constitutes an effective damping resistance placed across the inductance. This damping reduces current flow in the series resonant circuit sufficiently to cause device 1 to cease conduction. Resistor 6 is sufficiently large to prevent conduction of device 1 without the voltage stored in the series resonant circuit. Cut off of device 1 places the series resonant circuit in position to be shock excited by a subsequent trigger pulse 4.

Referring to Fig. 2, the nature of the wave shapes encountered in the arrangement of Fig. 1 are clearly disclosed. Upon the sudden conduction of the discharge device 1 in response to the incoming trigger pulse 4, shown in graph *a*, a sinusoidal current flows through elements 2 and 3 as shown in graph *b* for substantially a quarter of a cycle of the oscillation frequency of elements 2 and 3. The resultant voltage developed across the inductance 3 and hence available at the grid of device 5 is shown in graph *c*. It is noted that after the substantially instantaneous surge of negative voltage, the voltage on the inductance leads the current by 90°. The negative going pulse of voltage shown in graph *c* immediately cuts off electron discharge device 5, thereby generating the positive going square wave as shown in graph *d* at its anode electrode 17. As soon as the voltage shown at *c* overcomes the normal cutoff bias of device 5, device 5 conducts, thereby terminating the positive going square wave shown at *d*. This sudden conduction at the anode 17 of device 4 occurring after a quarter cycle of oscillation of the series resonant circuit provides the negative going trailing edge 18 shown in graph *d*, which is delayed with respect to the arrival of the incoming trigger 4. Upon differentiation, the positive going square wave shown in graph *d* yields the sharp negative trigger pulse 18*a*. This negative going pulse constitutes a trigger pulse, occurring at a definite delay time after the arrival of incoming trigger pulse 4, for application to succeeding stages.

Fig. 3 shows a modification of the circuit arrangement of Fig. 1 which lends itself readily to the generation of a plurality of output pulses delayed differently in time with respect to the time of arrival of the incoming trigger.

Referring to Fig. 3, elements common to circuits 1 and 3 are designated by the same reference numerals.

The input circuit including device 1 and the series resonant circuit comprising condenser 2 and inductance 3 are the same as in Fig. 1. In order to provide an additional pulse delayed differently in time with respect to the incoming trigger 4, an additional series resonant circuit comprising condenser 21 and inductance 22 are added. This latter resonant circuit is tuned to a different frequency of oscillation from that to which the series arrangement comprising elements 2 and 3 is tuned.

A double triode circuit comprising electron discharge devices 23 and 24 is utilized in place of the single triode shown in Fig. 1. Terminal 16 is connected to a control electrode 25 of electron discharge device 23, while a corresponding terminal 26 in the series resonant circuit comprising elements 21 and 22 is connected to the other control electrode 27 of device 24. The anodes 28 and 29 are connected through respective anode loading resistors 30 and 31 to the source of positive potential 32.

Under normal conditions, device 1 is nonconductive because its grid electrode 10 is connected to the source of negative potential 8 through resistance 9, whereas devices 23 and 24 are held conductive because their respective grids are returned to the common cathode through the relatively low direct current resistance paths of inductances 3 and 22 respectively. Under these conditions condensers 2 and 21 are normally charged to substantially the full potential of battery 7.

Upon arrival of the incoming trigger 4, gaseous discharge device 1 is rendered conductive thereby initiating oscillations in the series resonant circuits comprising devices 2 and 3, and 21 and 22 through the gaseous discharge path of device 1.

The voltages developed across the respective inductances comprise a sharp instantaneous negative going pulse followed by a sinusoidal return to zero at a rate dependent upon the resonance frequencies of the respective series resonant circuits. The instantaneous negative going voltages now available at terminals 16 and 26, and hence also at control electrodes 25 and 27, render devices 23 and 24 nonconductive, thereby developing a sudden rise in potential at the anodes 28 and 29 substantially at the time of arrival of the incoming trigger 4. After substantially a quarter cycle of oscillation of the voltage at terminal 16, device 23 is again rendered conductive, thereby providing a sudden drop in the voltage at its anode. At a time corresponding to substantially a quarter cycle of the voltage available at terminal 26, the device 24 is also rendered conductive, thereby generating a corresponding sudden drop in voltage at its anode 29. Since the series resonant circuits comprising elements 21, 22 and 2 and 3 are arranged to have different oscillation frequencies, the positive going square waves developed at anodes 28 and 29 are of a different time duration. Condensers 33 and 34 together with a common load resistor 35 constitute separate differentiating circuits for the voltages developed at anodes 28 and 29 to yield negative going pulses having a different delay with respect to the arrival of trigger pulses 4 in accordance with the oscillation frequencies of the respective series resonant circuits.

When two oscillating circuits, such as 21, 22 and 2, 3, are employed with a common gaseous discharge device, the currents flowing through each add alegebraically and the resulting sum flows through the gaseous discharge device until one or both currents are interrupted by the switching devices 23 or 24. As long as the algebraic sum of the currents is of sufficient magnitude and in the right direction the device 1 conducts. Thus when the grid 27 of device 24 goes positive after a quarter cycle of the resonant frequency of elements 21 and 22, device 24 conducts and current flow through 21 and 22 is halted. It being assumed that elements 2 and 3 are tuned to a lower resonant frequency than elements 21, and 22, then the grid 25 of device 23 goes positive sometime subsequent to that of grid 27 and that electron discharge device 23 conducts thereby halting current flow through elements 2 and 3. Thus even with no current flow through 21 and 22, sufficient charge exists on condenser 2 during the first quarter of its oscillation to sustain conduction of thyratron 1. Due to a finite grid to cathode impedance of devices 23, condenser 2 is actually charged slightly negatively when the device 23 conducts, thereby insuring that the gaseous device 1 is cut off after the second delay pulse has been generated. If it is desired to increase the negative charge on condenser 2 at the end of a quarter cycle of oscillation of elements 2 and 3, a grid resistor 37 may be inserted between junction 16 and grid 25. The addition of the resistor also increases the positive overshoot of the voltage at grid 25.

Referring to Fig. 4, the voltage wave shapes developed across the respective inductances 3 and 22 upon conduction of device 1 are shown in graph *c*. In this Fig. 4 voltage is plotted as ordinates against time plotted as abscissae. The voltage wave available at terminal 16 is shown in heavy line in the graph *c*, whereas the voltage wave developed at terminal 26 is shown in dotted line in the graph *c*. These voltages are developed in response to the current flow shown in corresponding lining in graph *b*. The sharp negative going pulses of the voltages shown in graph *c* cut off corresponding devices 23 and 24, thereby developing the positive going square waves at the anodes 28 and 29 shown in graph *d* substantially at the time of arrival of the incoming trigger 4. As soon as the voltages developed across inductances 3 and 22 go positive as shown in graph *c*, the corresponding devices 23 and 24 are rendered conductive thereby generating a sudden drop in voltage at their respective anodes as shown in graph *d* The voltage waves shown in graph *d* in solid and dotted line are developed at the anodes 29 and 28 respectively.

Upon differentiation of the wave shapes shown in graph *d* the negative going trigger pulses shown in graph *e* are provided. It should be noted that the negative going pulses shown in *e* occur at the time intervals 38 and 39 and correspond to definite delay time intervals with respect to the time of arrival of the incoming trigger 4 depending upon the resonance frequencies of the associated series resonant circuits.

Although the circuit arrangement of Fig. 3 discloses the use of two series resonant circuits for providing a pair of differently delayed output pulses, a plurality of such networks may be employed together with respective output electron discharge devices for generating the various pulses. An adjustable delay is attainable by using permeability tuned coils, although a variable capacitor would also give a variable delay. It should be noted that these results are achievable with a minimum of components, while requiring a minimum of modification or adjustment to provide additional pulses having delay times that are selectable.

I have shown only certain preferred embodiments of my invention by way of illustration. Many modifications will occur to those skilled in the art and I therefore wish to have it understood that I intend in the appended claims to cover all such modifications as fall within the true spirit and scope of my invention.

What I claim as new and desire to secure by Letters Patent of the United States is:

1. In combination a series resonant circuit comprising an inductance and a capacitance, a normally inoperative switching device connected across said circuit, means for operating said device to shock excite said circuit thereby to produce an oscillation at the resonant frequency thereof, means responsive to said oscillation for generating an impulse delayed with respect to the time of excitation of said circuit, and means responsive to said oscillation to restore said switching device to its condition prior to said operation.

2. In combination a circuit comprising an inductance, a capacitance and a source of fixed unidirectional potential connected in series, said inductance and capacitance being series tuned to a given frequency, a normally inoperative electron discharge device having its electron discharge path connected across said condenser and inductance, means for shock exciting said condenser and inductance into oscillation through the electron discharge path of said device comprising means for rendering said device operative, means for generating an impulse delayed with respect to the time of excitation of said inductance and capacitance in response to said oscillation, and means for rendering said device inoperative in response to said oscillation.

3. In combination a circuit comprising an inductance, a capacitance and a fixed unidirectional potential source connected in series, a normally inoperative electron discharge device having its electron discharge path connected across said inductance and capacitance whereby said capacitance is normally charged substantially to the potential of said source, a normally conductive electron discharge device comprising an input circuit connected directly across said inductance and an output circuit, means for shock exciting said capacitance and inductance into oscillation at the series resonant frequency thereof, comprising means for rendering said electron discharge device operative, said second device responsive to the voltage devoloped across said inductance for generating an impulse delayed with respect to the time of said excitation, and means for rendering said device inoperative in response to said oscillation.

4. In combination a plurality of circuits each comprising a series connected condenser and inductance, means for charging each of said capacitances from a fixed unidirectional potential source, a common, normally inoperative, gaseous discharge device connected in parallel across each of said series circuits, a respective electron discharge device for each of said series circuits comprising an input circuit connected across a respective inductance and an output circuit, means for rendering said gaseous discharge device operative to thereby shock excite each of said series circuits into oscillation at their respective series resonant frequencies through the gaseous discharge path of said device, each of said respective devices responsive to the voltage developed across a respective inductance for producing an impulse in the output circuit delayed with respect to the time of excitation of said series circuits, and means for rendering said gaseous discharge device inoperative in response to the oscillations produced in the series circuit having the lowest resonant frequency.

5. In combination a series resonant circuit comprising an inductance and a capacitance, means for charging said capacitance to a given potential, a normally non-conductive gaseous discharge device having its gaseous discharge path connected across said series circuit, an impulse source, said gaseous device responsive to said impulse for becoming conductive to shock excite said series circuit into oscillation through its gaseous discharge path, a normally conducting electron discharge device having an input circuit connected across said inductance and an output circuit, said electron device being responsive to the oscillation developed across said inductance for becoming non-conductive for substantially the first quarter cycle of oscillation of said series circuit and thereafter becoming conductive again, said electron discharge device offering a substantially lower impedance in its input circuit when conducting than when not conducting to damp said oscillation and thereby render said gaseous device non-conductive.

HARRY SIMON.
JOSEPH P. GLEASON.

No references cited.